United States Patent [19]

Crosby et al.

[11] 4,272,689
[45] Jun. 9, 1981

[54] FLEXIBLE WIRING SYSTEM AND COMPONENTS THEREFOR

[75] Inventors: Philip C. S. Crosby, Lexington, Mass.; Philip A. Barrios, Nashua, N.H.; Ronald R. Perry, Billerica, Mass.

[73] Assignee: Harvey Hubbell Incorporated, Orange, Conn.

[21] Appl. No.: 944,997

[22] Filed: Sep. 22, 1978

[51] Int. Cl.$^3$ .............................................. H02B 1/08
[52] U.S. Cl. .............................. 307/147; 339/258 S; 339/198 P
[58] Field of Search .................... 307/147; 174/48, 49; 339/258 S, 258 P, 198 P, 198 S, 156 R, 156 T, 163, 19

[56] References Cited

U.S. PATENT DOCUMENTS

| | | | |
|---|---|---|---|
| 2,611,800 | 9/1952 | Naughton | 339/22 |
| 3,144,502 | 8/1964 | Weiss | 174/52 |
| 3,247,368 | 4/1966 | McHugh | 362/228 |
| 3,648,219 | 3/1972 | Goldman | 339/45 M X |
| 3,683,100 | 8/1972 | Deal et al. | 174/48 |
| 3,683,101 | 8/1972 | Liberman | 174/49 |
| 3,715,627 | 2/1973 | D'Avsilio | 339/23 X |
| 3,719,768 | 3/1973 | Jonsson | 174/49 |
| 3,745,515 | 7/1973 | Michaels | 339/156 R |
| 4,001,571 | 1/1977 | Martin | 339/28 X |
| 4,134,045 | 1/1979 | Quin | 315/324 |
| 4,146,287 | 3/1979 | Jonsson | 339/75 M |

OTHER PUBLICATIONS

Architectural Power Systems, Oct. 1976, Plug-In Flexible Wiring Systems.
Montgomery Ward's Catalog, 1961, p. 1243, Item 59.
Dual-Lite, Wiring Products Division, 6/77, Modular Wiring TM, Power Poles, Poke-Thru Devices.

Primary Examiner—L. T. Hix
Assistant Examiner—James L. Dwyer

[57] ABSTRACT

A modular, branch circuit electrical power distribution system and components therefore, of the flexible wiring type. Lighting fixtures and devices are wired to connectors which employ contact assemblies comprising an integral combination of a male contact, a female contact, interconnecting bussbar and wire-securing means. This entire integral assembly is formed from a single piece of suitably cut and bent sheet metal stock. The integral male contact, female contact, bussbar, and wire-securing means contact assembly. This contact assembly permits power to be received from one cable set, transmitted to another cable set and tapped off to feed a fixture, receptacle, or other device. Cable sets have male connectors at one end and female connectors at the other end; other system components employ similarly corresponding sets of male and female contacts. Switches and receptacles are connected to couplers which may be fed by cable sets. The couplers are affixed to cable whips which feed wiring directly from the couplers to switches and receptacles.

7 Claims, 26 Drawing Figures

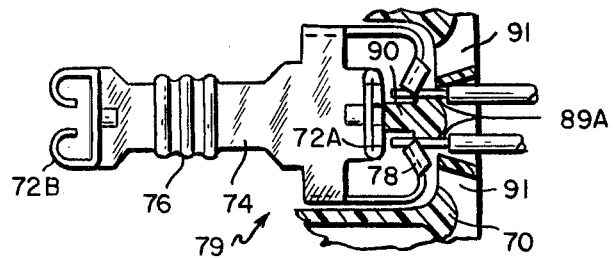
FIG.3A
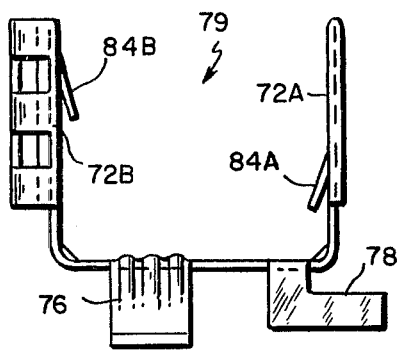
FIG.3C  FIG.3B
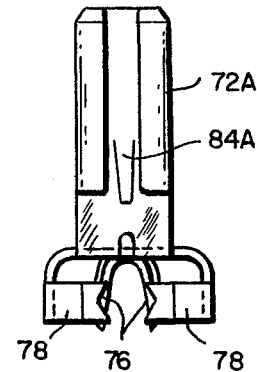
FIG.3D
FIG.4
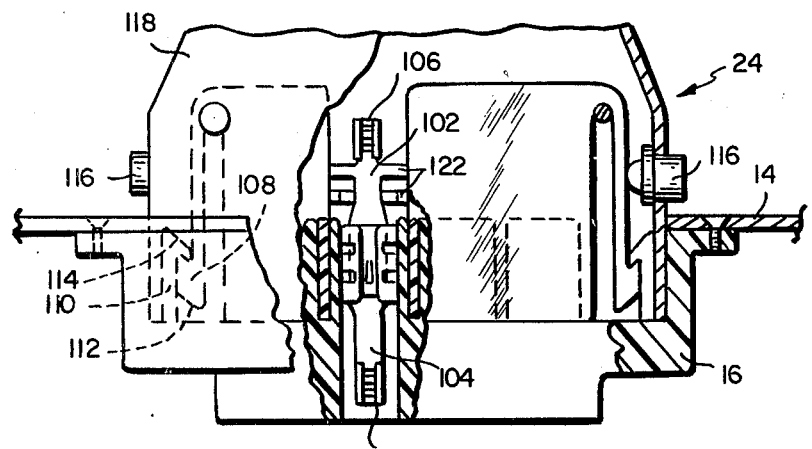
FIG.8

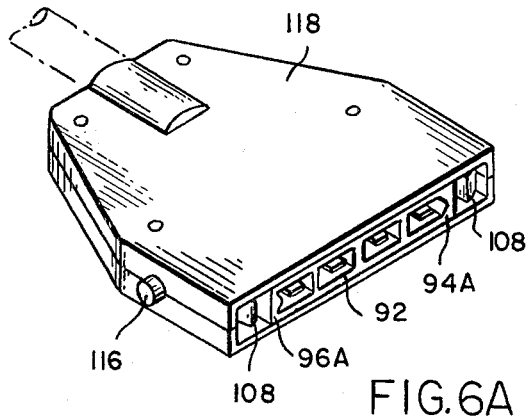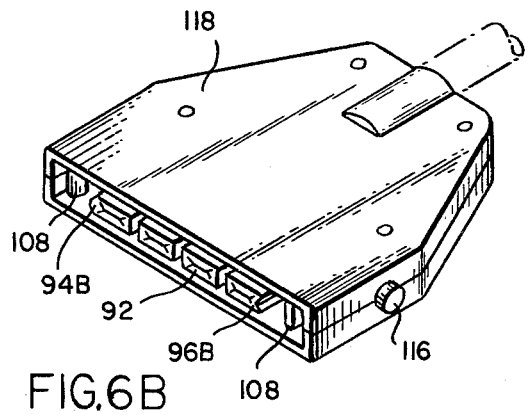
FIG.6A  FIG.6B
FIG.7A  FIG.7B
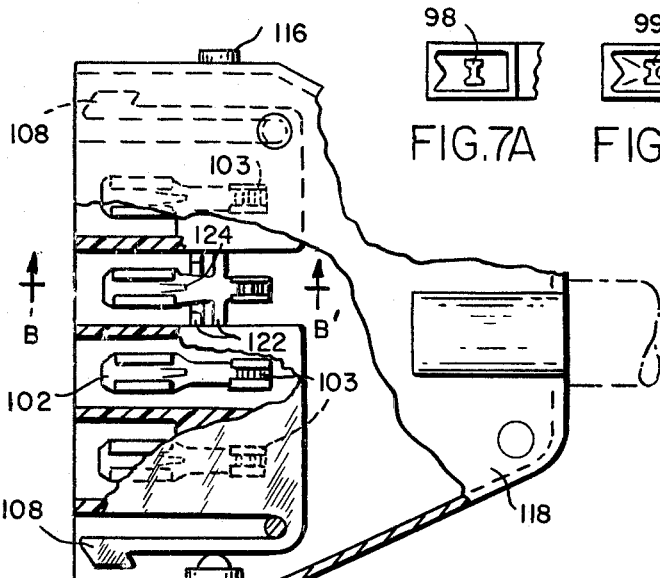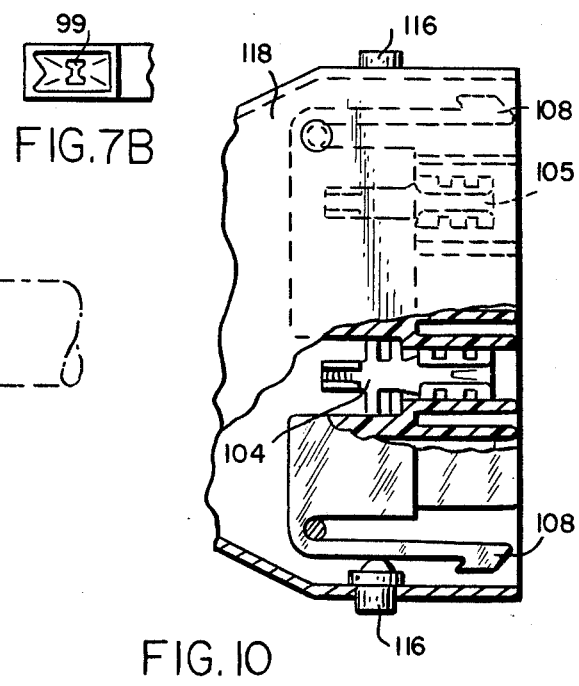
FIG.9  FIG.10
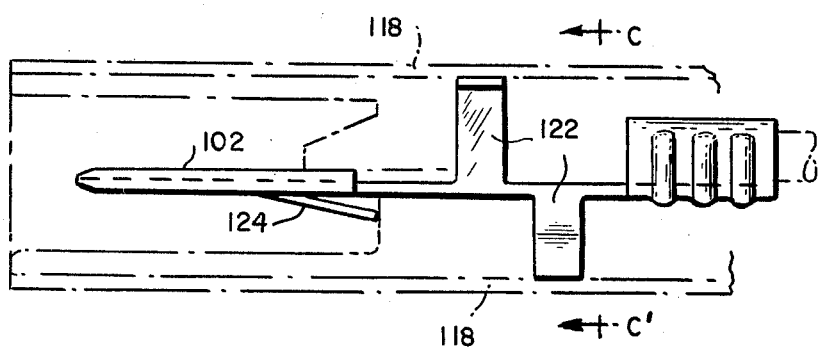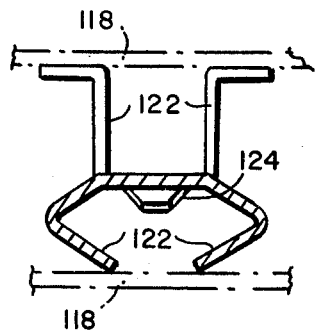
FIG.11  FIG.12

FLEXIBLE WIRING SYSTEM AND COMPONENTS THEREFOR

FIELD OF THE INVENTION

This invention relates to the field of electrical power distribution, particularly branch circuit power distribution. The invention furthermore particularly pertains to a flexible wiring system for branch power distribution and to components adapted for use therein.

BACKGROUND OF THE INVENTION

The concept of flexible wiring for branch circuit power distribution apparently was introduced in the United States in 1939, by Rugg et al in U.S. Pat. No. 2,162,864; the first commercial flexible wiring products, though, are believed not to have been introduced until 1971. The term "flexible wiring" refers to the use of a modular type of wiring system in which flexible cable sets are used to interconnect light fixtures, switches, receptacles, etc. The cable sets are designed with a connector at each end and each of the other components to be interconnected is provided with a connector to mate in some fashion to one or more cable sets. Components and cable sets are merely plugged together, virtually eliminating the need for "hard" wiring.

The first commercial cable sets for flexible wiring systems were made from rubber sheathed cable. Because Underwriter's Laboratory ("UL") would only accept cable sets with flexible metal armor sheathing for listing as approved products, rubber sheathed cable gave way to cable sheathed in flexible metal armor. By means of factory fabricated pre-assembled cables of varying length, with connectors attached on each end, and arrangements of distribution modules, switching modules and loads (such as lighting fixtures) provided with suitable connectors, a complete branch circuit wiring system can be installed, with the need for conventional conduit and wire being virtually eliminated. Thus, much less labor is required to install a flexible wiring system than is required for the installation of a conventional "hard" wiring system. Flexible wiring systems have further advantages such as providing flexibility for future changes in layout. Lighting fixtures, receptacles and switches can be easily relocated simply by unplugging, rearranging and plugging in at new locations.

However, prior flexible wiring systems and the components therefor have substantial disadvantages attendant to their manufacture and use. Some of these drawbacks include high parts counts and expensive-to-manufacture component designs, contact designs unsuitable for making and breaking connections under load, connector designs deficient in terms of mechanical stability and secure connector locking, and difficult- or expensive-to-install receptacle designs for adapting light fixtures and the like to flexible wiring systems.

SUMMARY AND OBJECTS OF THE INVENTION

These and other problems of prior art flexible wiring schemes are addressed and are intended to be alleviated by the present invention. Accordingly, it is a principal object of the present invention to provide a flexible wiring system and components therefore designed for efficient, inexpensive manufacture and, in particular, adapted to mass production manufacturing techniques.

It is a further object of this invention to provide a flexible wiring system and components therefor which simplify the adaptation of lighting fixtures and the like to a flexible wiring system, both at the assembly-line level and at the system installation site.

Another object of this invention is to provide a flexible wiring system and components therefor suitable for making and breaking connections under load.

Another object of this invention is to provide a flexible wiring system and components therefor of superior mechanical strength and interconnection stability and also being particularly adapted to economical manufacture.

Yet another object of the present invention is to provide a flexible wiring system and components therefor wherein a light fixture or the like is adaptable for connection thereto by means of a receptacle particularly adapted for receiving the fixture wires and providing a simple, reliable means for connecting the fixture wires to the receptacle contacts.

These and other, further objects of the present invention, which will become apparent from the discussion below, are accomplished by a unique flexible wiring system including the components therefor. In this system, lighting fixtures or the like are provided with fixture receptacles which are mounted on special access plates. These receptacles are used to adapt the lighting fixtures to connect to cable sets for supplying power to the fixture and serially distributing power therefrom to other fixtures. Each fixture receptacle comprises a pair of connectors; each of the connectors comprises a set of connector contacts in a unique housing. Each connector contact in one of the connectors is associated with and to a corresponding connector contact on the other connector. Each pair of thus associated contacts is integrally formed as a unitary assembly having a male contact, a female contact, a bussbar connecting the contacts, and means for securing a wire thereto. This entire assembly is formed from a single piece of suitably cut and bent sheet metal stock. Other system components compatible therewith are shown.

BRIEF DESCRIPTION OF THE DRAWINGS

These and other features of the present invention are more fully described below in the detailed description of an illustrative embodiment, presented as an example and not by way of limitation, and in the accompanying drawing in which:

FIG. 3A is a top plan view of the unitary fixture receptacle contact of the present invention, together with a cutoff sectional view of the molded housing therefor, illustrating the operation of the push-in contact terminals thereof;

FIG. 3B is a side view of the contact of FIG. 3A;

FIG. 3C is an end view of the contact of FIG. 3A from the female contact end;

FIG. 3D is an end view of the contact of FIG. 3A from the male contact end;

FIG. 4 is a layout view of a sheet metal blank for the unitary contact assembly of FIGS. 3A-3D;

FIGS. 6A and 6B are, pictorial perspective views, respectively, of male and female cable connectors according to the present invention;

FIGS. 7A and 7B are end views, respectively, of a male and a female connector contact position according to the present invention, each having internal keying surfaces in the shape of an I-beam;

FIG. 8 is a partially sectioned, partially cutaway plan view showing a male cable connector inserted in a power feed receptacle, particularly illustrating the cable connector latching mechanism, contact mating features and cable connector contact grounding wings;

FIG. 9 is a partially cut away top view of a male cable connector showing a male grounding contact and, in phantom, regular, non-grounding male contacts;

FIG. 10 is a partially cut away top view of a female cable connector showing a female grounding contact and, in phantom, a regular, non-grounding female contact;

FIG. 11 is a side sectional view of the male, grounding cable connector contact; of FIG. 9 taken along the line B—B' thereof FIG. 12 is a sectional view of the contact of FIG. 11 taken along the line C—C' thereof;

FIG. 13B is a side sectional view of the mounting plate of

FIG. 13A taken along the line D—D' thereof;

DETAILED DESCRIPTION OF AN ILLUSTRATIVE EMBODIMENT

Figure 1:
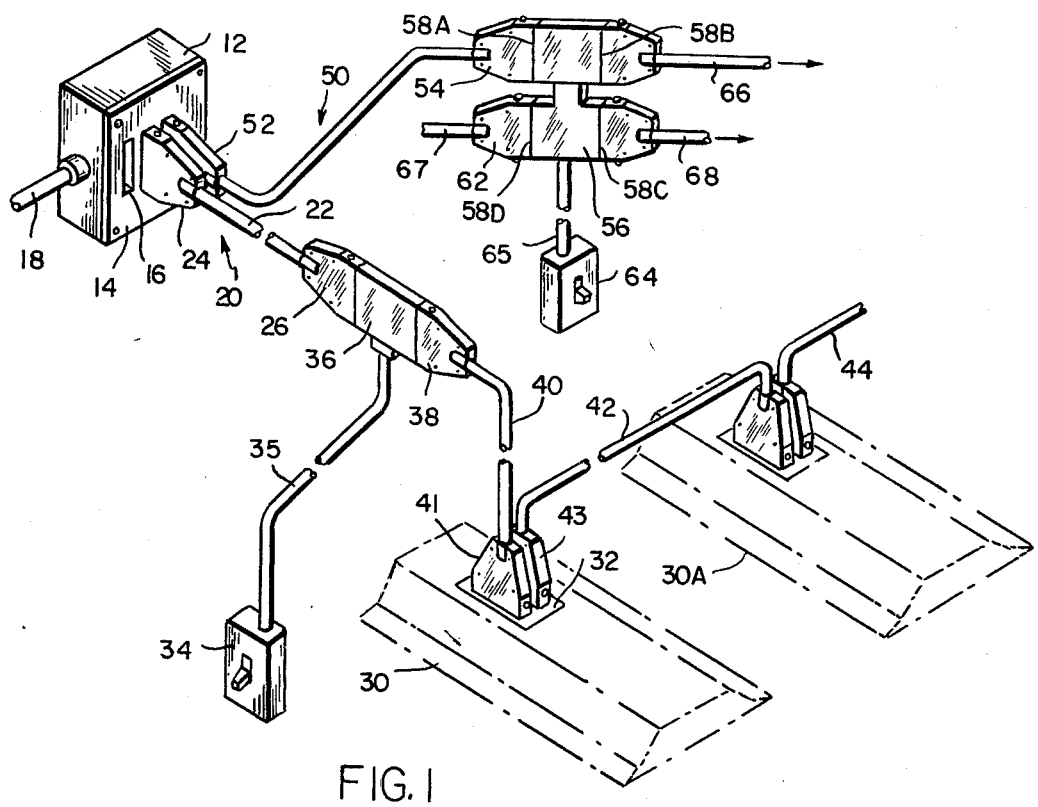
FIG. 1 is a pictorial illustration of an exemplary portion of a flexible wiring system according to the present invention.

Referring now to FIG. 1 there is shown in pictorial form an exemplary portion of a flexible wiring system incorporating the present invention. The flexible wiring system must be interfaced with the basic, hard wiring from the installation's power distribution panel, of course. This interfacing is done at a junction box 12 by means of junction unit 14. The junction unit 14 comprises a plate for closing the open face of the junction box, and one or more connectors 16 mounted thereon. These connectors are referred to as "power feed receptacles". Each power feed receptacle 16 comprises a connector mateable with the cable sets and has contacts which are connected to the wires within electrical power feed conduit 18 which runs between the site's power distribution panel and the junction box. A cable set, e.g., cable set 20, can then be plugged into a power feed receptacle for feeding power into the flexible wiring system.

Each cable set, such as cable set 20, comprises a length of cable 22 with a pair of cable connectors 24 and 26, one at each end. Generally the cable 22 will be provided in one or more predetermined lengths and, except for this length difference, all cable sets of a given function and voltage/current rating are interchangeable. Cable sets may be supplied in either two, three or four conductor versions, for single or multiple circuit use, respectively. Naturally, cable sets may also be specially adapted for particular types of applications or functions and a larger number of conductors may be included. Regardless of the particular type of cable set under consideration, the cable connector at one end thereof, e.g., cable connector 24 will be provided with male contacts, while the cable connector at the other end, e.g. 26, will be provided with female contacts. Thus connectors 24 and 26 are referred to as male and female cable connectors, respectively. The cable 22 extending between the cable connectors simply comprises a plurality of suitable conductors enclosed in a protective flexible metal sheath. It is noted, for purposes of clarification, that when the terms "male" and "female" are used herein they are intended to exclude a hermaphrodite element.

Each lighting fixture or other load device to be fed by the system of the present invention, such as a lighting fixture 30, must employ a fixture receptacle 32 for mating with the cable sets, in order to receive power. Fixture receptacle 32 comprises a pair of connectors each of which is basically similar to power feed receptacle 16, except that one of the connectors of the fixture receptacle is adapted to mate with a male cable connector while the other is adapted to mate with a female cable connector. The fixture receptacle 32 thus provides a tap off point for connecting the lighting fixture 30 into the power distribution system to receive power via a first cable set and also enables a second cable set to be connected to the first cable set, for supplying power to another load device or fixture (e.g., fixture 30A), in parallel.

As illustrated in FIG. 1, it is typical that light fixtures 30 and 30A will be switchable on and off via a wall switch 34. To accomplish this function, a switching coupler 36 is provided for connecting a switch into the branch circuit. This coupler has two connectors, one on either end, for mating with a pair of cable connectors. A permanently affixed length of cable (i.e., a cable "whip") 35 is provided with coupler 36 for connection to switch 34. One of the coupler connectors mates to a male cable connector, e.g., 38, while the other set of connectors mates to a female cable connector, e.g., 26. The "hot" power lead is broken in the switching coupler and run through switch 34. Thus, cable 40 receives switched power such that fixtures 30 and 30A may be turned on or off according to the state of switch 34 via whip 35. Cable 42 acts merely as an extension of cable 40, for supplying power transmitted through the receptacle of fixture 30 to fixture 30A. Cable 44 is a similar extension for feeding power downstream from fixture 30A.

Numerous other, switching configurations can be accomplished with the addition of components which are combinations and variations of those already noted; the complexity of the system is at the disposal of the user. For example, cable set 50 feeds one such arrangement from junction unit 14. Specifically, male cable connector 52 of cable set 50 plugs into a power feed receptacle on junction unit 14 and female cable connector 54 on the other end of cable set 50 plugs into a switching and distribution coupler 56. The coupler 56 mates with four cable connectors via four corresponding connectors in the coupler. A first one of these coupler connectors, indicated at 58A, comprises male contacts for mating with female cable connector 54. The other three connectors, generally indicated at 58B, 58C and 58D are female connectors for supplying power out to load devices via cable sets 66-68, respectively. Each of these female connectors may have either switched or unswitched power provided therto, according to the particular application. The permanently affixed cable whip 65 brings, the required wiring to associated switch by which, in turn, implements the switching desired.

The contacts within the connectors at 58A-58D may be interconnected in any of a variety of ways to implement desired switching functions, as more fully discussed below. For example, one of the possibilities is to employ an appropriate switch (or switches) 64 such that depending on its position, power is supplied to cable set 67 alone, cable set 68 alone, to both such cable sets, or to neither of them. If these cable sets feed a double-ballasted light fixture, with a single fluorescent lamp connected to one of the ballasts and two fluorescent lamps connected to the other ballast, this switching arrangement permits the selection of either one, two or three lamps, switch 64 might, for example, actually comprise two single pole, single throw switches, to provide this switching capability.

One significant advantage of this invention is that it greatly facilitates the adaptation of conventional fluorescent lighting fixtures to a flexible wiring system. In the past, the adaptation of a fluorescent light fixture to flexible wiring has generally involved the installation of two connectors on the lighting fixture, for connection to two respective cable sets. It was further necessary not only to wire each connector contact to the fixture (i.e., the ballast), but also to a contact in the other connector, as the connectors were separate units. Each contact of the connectors was supplied with a 12 gauge A.W.G. wire (assuming the system to be rated at 20 amperes). By contrast, the wires from a conventional fluorescent lamp ballast are typically 1 gauge A.W.G. Therefore, the installation of the prior art connectors requires that, for each lead, two 12 gauge wires be connected with one 18 gauge wire. Making this connection is not easy, both due to the inflexibility of the larger wires and due to the mixture of wire sizes. Significant labor is involved in producing a good connection. The fixture receptacle 32 essentially eliminates these problems.

Figure 2:
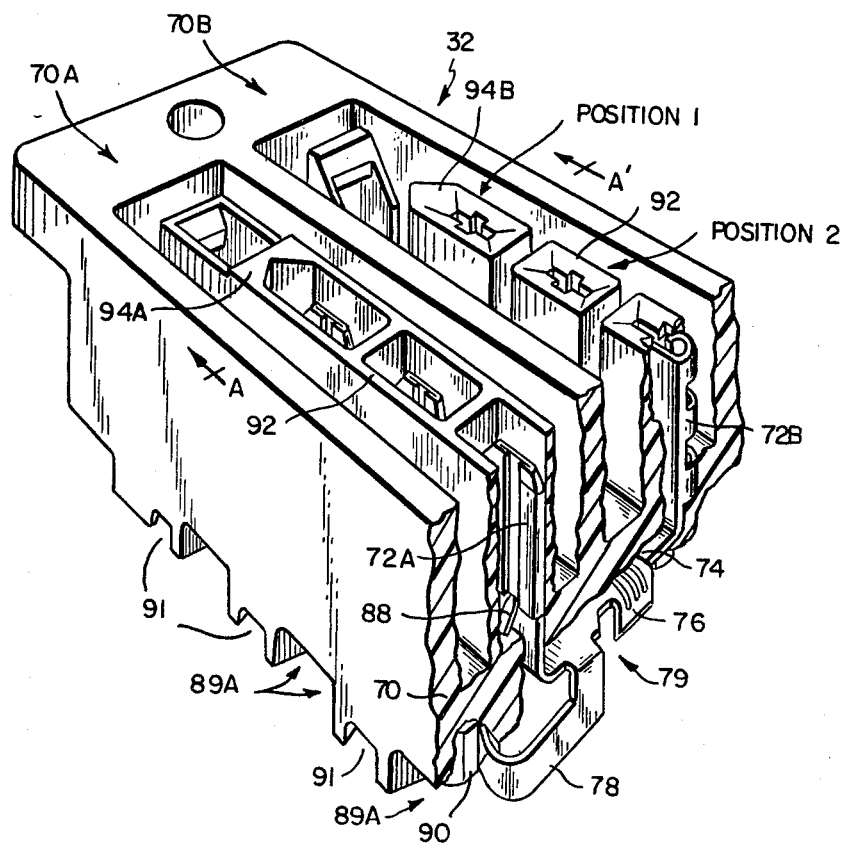
FIG. 2 is a partially sectioned, perspective view of a fixture receptacle connector according to the present invention, particularly illustrating the unitary male/female/bussbar connector thereof, the end section being taken perpendicular to the longitudinal dimension of the receptacle.

Referring to FIG. 2, fixture receptacle 32 is shown in a partially broken off, partially sectional view showing the unique contact and connector design employed therein. The two connectors which are needed to permit the fixture to mate to two cable connectors (e.g., 41 and 43) comprise a unitary, molded plastic contact housing assembly 70 corresponding to a first connector. The housing comprises an "input" side 70A through which power is received and an "output" side 70B corresponding to a second connector through which power may be transmitted downstream to more remote loads. The connector on the input side has male contact members, while the connector on the output side has female contact members. Each contact member on the input side has a corresponding contact member on the output side both of which will carry the same lead—i.e., hot, neutral, ground, etc. Such a pair of contacts has a physically associated location in the connector contact housing. This location is referred to as a "position" in the connector, for short, such as "position 2." Corresponding male and female contacts, (e.g., contacts 72A and 72B, respectively, at position 3) are integrally formed from a single piece of sheet metal stock so as to be joined together by an integral bussbar conductor 74. Bussbar 74 is equipped with crimp tabs 76 and push-in, wire-retaining contact terminals 78. Circuit installation of such an integral contact assembly 79 is completed by simply securing a single wire to the bussbar by using either the crimp tabs 76 or the push-in terminals 78. This is a much faster and inherently more reliable installation process than afforded by the prior art approach described above. Moreover, two connectors are combined into one integral assembly, reducing parts count and the material costs as well. Also, only one hole is needed in the fixture and there is only one piece to mount therein.

The unitary connector housing assembly 70 is molded with passages for receiving contact members 72A and 72B from the rear. Both the male and female contacts are provided with locking tabs, 84A and 84B, respectively. When the contact assembly 79 is pushed into the molded connector housing 70, the locking tabs spring into place against locking steps, such as locking step 86A shown in FIG. 2, to retain the contact assembly securely in the housing and prevent its accidental withdrawal therefrom. Molded openings are provided in the side of the housing facing the push-in terminals 78. A wire inserted through the opening will then be retained by a push-in terminal, in contacting relation therewith.

Male contact 72A, female contact 72B, bussbar conductor 74, crimp tabs 76, push-in, wire-retaining contact terminals 78 and locking tabs 84A and 84B are formed as a unitary assembly from a single stamped and bent piece of sheet metal. Further views of this assembly are shown in FIGS. 3A-3D and the layout of the sheet metal blank prior to bending and folding is shown in FIG. 4. FIG. 3A is a top view of the fixture receptacle contact assembly, FIG. 3B is a side view thereof, and FIGS. 3C and 3D are side views from the female contact side and from the male contact side, respectively. FIG. 3A also shows a sectioned position of the housing 70 to illustrate the operation of the push-in terminals of the contact assembly.

In FIG. 4, the members 82 shown in dashed outline are carrier tabs which are used during fabrication for holding the blank; they are then cut off. The push-in contacts 78 are formed from the "wings" 77. These wings are first bent downwards along dashed lines 88 and then the ends thereof are turned inward along the lines 92. For greater strength, the end portions of the wings may be bent back on themselves to give a double thickness. Also, a notch may be cut in the end of the push-in contact to provide a firmer grip on the pushed-in wire, such as illustrated in FIG. 3D.

The contact terminals 72A and 72B and their mating contacts in the cable connectors are formed from tinned brass stock, CDA 194 alloy, ½ hard, 0.020-0.030 inches thick. This provides the strength, resiliency and current-carrying capacity required for these contacts and permits them to be rated acceptable for making and breaking connections under load.

All contacts, male and female alike, in all connecters are mounted within molded plastic housings which provide insulating barriers between and around the contacts. The molded housings containing the female contact members are "dead-fronted," to minimize accidental contact with the female contacts since these are conventionally the energized or "live" contact members. The molded contact housings also serve as a physical keying means for insuring that a cable connector can only be mated with an appropriate, corresponding connector which is compatible in terms of function and ratings. The physical keying requires that the cable connectors are properly oriented when mated to other connectors, so that proper lead correspondence is maintained. Thus, it is virtually impossible to make an improper connection of system components.

Figure 5:
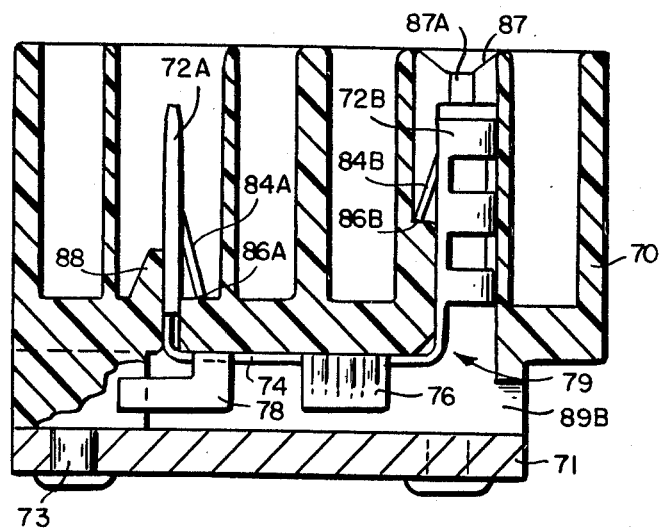
FIG. 5 is a sectional view of the fixture receptacle and fixture receptacle contact of FIGS. 2 and 3A-3D taken along the line A—A' of FIG. 2.

FIG. 5 shows a further cross-sectional view of the fixture receptacle contact housing assembly 70 taken along the line A—A' of FIG. 2. This view shows in greater detail the locking tabs 84A and 84B of the contact members and the associated locking steps 86A and 86B in the molded housing. It is also noted that the portion of the housing which receives the female contact member 72B is provided with an inwardly sloped, "dead-fronted" access surface 87 through which a male contact may be inserted. The sloped access surface both guides the male contact into the access opening 87A and limits the region through which contact may be established with the female contact member, to prevent accidental access thereto. The housing assembly 70 also contains a support 88 at the base of the male contact. The lower portion of the female contact is supported by virtue of the placement of locking step 86B about half-way up the length of the female contact member. An opening 89B is provided in the side of the housing 70, at the bottom thereof, on the female contact side, to permit a wire to be inserted therethrough for attachment to the crimp tab 76. On the other side of the housing, a pair of openings 89A are provided adjacent push-in terminal 78, also to permit wires to be inserted therethrough. A bullet-shaped barrier 90 is provided by the housing to separate openings 89A and provide a bearing surface opposite the ends of the push-in terminals 78, so that when a wire is inserted, it is grabbed between the bullet-shaped barrier and the end of a push-in terminal. Additional openings 91 are formed in the housing to permit a thin object to be inserted and pressed against the end of push-in terminal 78, when it becomes necessary to release a wire therefrom. This latter feature, of course, is typical of push-in contact arrangements. Preferably the back of housing 70 is closed by a cover plate 71, also of molded plastic, after the contact assembly(ies) 79 has (have) been inserted. One practical way to assemble the cover is shown in the figure. Housing 70 may be provided with cylindrical pegs 73. The cover has matching holes. After the cover is installed over the pages, the ends of the pegs may be subjected to ultrasonic heating, to soften the plastic; they are then flattened against the cover plate, forming plastic rivet heads.

Figure 16:
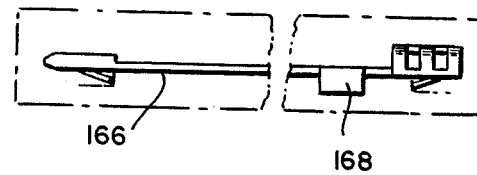
FIG. 16 is a side view of a unitary, integral contact assembly for the adaptor of FIG. 15.

It should be appreciated that the construction of the contact housings in other types of connectors, such as cable connectors, is basically the same as that shown for the fixture receptacle housing. However, only the fixture receptacle uses the U-shaped unitary male contact-/female contact/push-in terminal and crimp tab assembly. Other connectors generally have only crimp tab connections to fasten wires thereto. This is illustrated, for example, in FIGS. 9–12 and 16. The assembly in FIG. 16 is analogous to the U-shaped assembly 79 but is of an in-line configuration and lacks push-in terminals.

Two types of keying surfaces are used in this system. One is referred to as an internal keying surface while the other is referred to as an external keying surface. The difference may best be understood by reference to FIGS. 5, 6A and 6B in conjunction with FIG. 2. For a particular position in any of the connector assemblies, two regions are defined. The border between the regions is indicated generally by the rectangular outline 92 of the middle positions of the connector. Any physical keying information contained inside this border is referred to as internal keying information. Any keying information contained outside of this border is referred to as external keying information. External keying information is provided only at the two end connector positions. For simplicity of manufacture, a notch or V-shaped external keying surface configuration is shown, although other keying shapes would be equally usable. At one end of the connectors, the apex of the external V-shaped key points outward away from the other connector positions, as at 94A and 94B; at the other end of the connector, the apex of the V points inward toward from the other connector positions, as at 96A and 96B. It will be seen that this double ended keying prevents the connectors from being reversed accidentally. Further, some prior art keying designs use physically weak structures which are easily broken, defeating their efficiency; by contrast, this keying configuration is strong and does not have easily broken features. Internal keying is also available, to permit cable sets and other components to be keyed to particular functions or ratings so as to insure that only compatible components may be connected together. Generally, internal keying involves molding a predetermined shape into at least one position of the connector such that that position is then only able to mate with a connector having the "reverse" configuration at the corresponding position. For example, one possibility is suggested in FIGS. 7A and 7B. As shown in FIG. 7A, one position of a male connector (see FIG. 6A) is molded with an insert 98 generally in the shape of an I-beam extending in a direction perpendicular to the normal contact direction. The corresponding female connector position is shown in FIG. 7B. The position which receives the I-beam insert is molded with an opening 99 which is a reverse image of the insert. A connector having this female molding will not be able to receive a normal male contact at that position, nor will this type of male key be insertable in a normal female contact position.

Details of the mating relationship between a cable connector having male contacts, e.g., cable connector 24, and a power feed receptacle 16 are shown in FIG. 8. In that figure, a partial cutaway is used to illustrate the mating of one exemplary pair of contacts, male contact 102 and female contact 104. Each of these contacts is provided with a crimp tab 106 for securing a wire thereto. The cutaway also shows the details of the latching mechanism useful for securely retaining the cable connector in the receptacle so that it cannot work loose accidentally. The cable connector is provided with a pair of resilient, hooked latch members 108 and the power feed receptacle is provided with a corresponding pair of dogs 110. By virtue of the sloped surfaces 112 and 114 in the latch hook members and the dogs, respectively, the latch members will easily ride over the dogs when the cable connector is being inserted and will then spring outward and lock as shown. A reciprocable pair of push buttons 116 are provided on opposite sides of the cable connector, bearing against the elongated legs of the latchhook members for applying pressure thereto in order to release the latching mechanism when it is desired to remove the cable connector. The entire cable connector mechanism including contact, molded connector housing and latch hook members is protected by a metal shroud 118. Release buttons 116 are retained in holes in the cable connector shroud. The ground wire in each cable set is connected to this metal shroud which is, in turn, secured to the metal cable sheath. This grounding connection to the shroud is provided by special grounding wings on the connector contact to which the grounding wire is attached. In FIG. 8, the exposed contacts 102, 104 are the gounding contacts and the special grounding wings are illustrated as elements 122. The latching dogs 110 are spaced inwardly from the end walls of the receptacle 16 sufficiently to permit the wall of the metal shroud to pass therebetween, so that only metal surfaces remain exposed outside the connector interface.

FIGS. 9–12 further illustrate the special grounding contacts used in the cable connectors. The male grounding contact 102 is featured in FIG. 9, while the female grounding contact 104 is featured in FIG. 10. FIG. 11 is a sectional view of the contact 102 taken along the line B—B' of FIG. 9. Grounding wings 122 extend outwardly from the plane of the contact so as to establish firm physical contact with the metal cable connector shroud 118 shown in phantom in FIG. 11. It should also be noted that each of the cable connector contacts has a locking tab (e.g., tab 124 of male contact 102) which functions similarly to locking tab 124 of 84A of the unitary fixture receptacle contact, to retain the contact in its molded housing. Another sectional view of contact 102 is shown in FIG. 12, taken along the line C—C' of FIG. 11. This view shows how at least one pair of grounding wings 122A may be bent in the form of knees so as to provide a resilient, bearing contact against the shroud surface.

Digressing briefly, it may be helpful to point out that the cable connectors are designed as very thin units, suitable for manufacture with a thickness of less than ¾ of an inch in the embodiment illustrated. Likewise, other than power feed receptacles and fixture receptacles, most of the components shown herein for connection to cable connectors are of similar thickness, such as switching coupler 36 and switching and distribution coupler 56. This thin design permits cable sets and couplers to be installed in very narrow passages in ceilings and furniture. In the latter case, this design feature makes the present system uniquely well suited for hidden wiring within office furniture, to power office equipment.

Figure 13A:
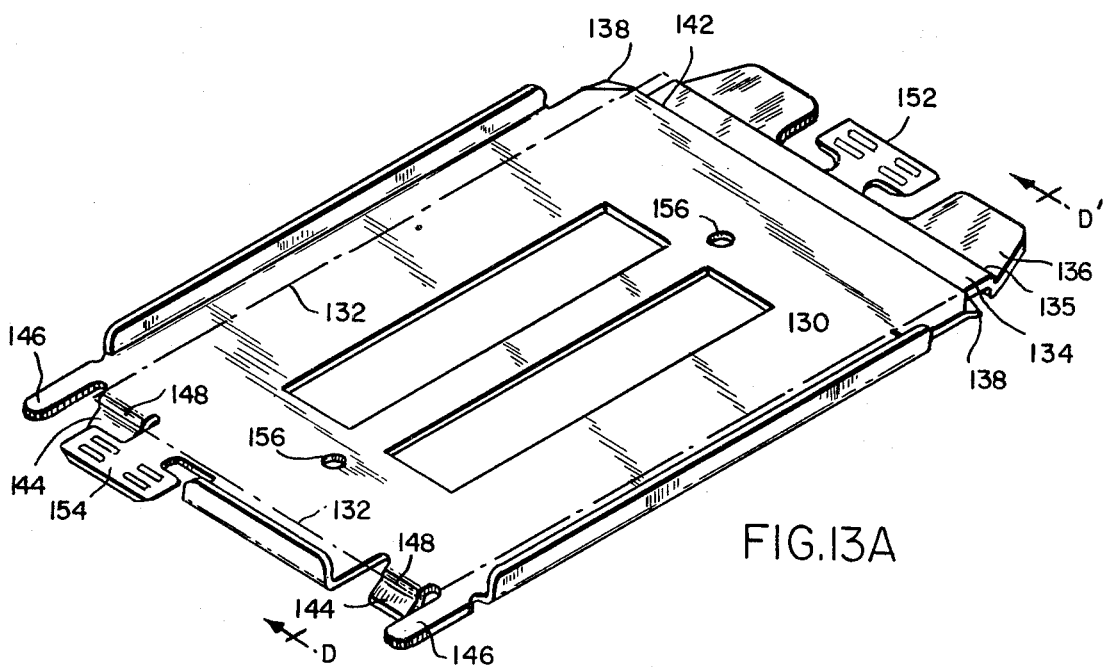
FIG. 13A is a perspective view of a mounting plate for the fixture receptacle of the present invention.
Figure 13B:
Figure 14:
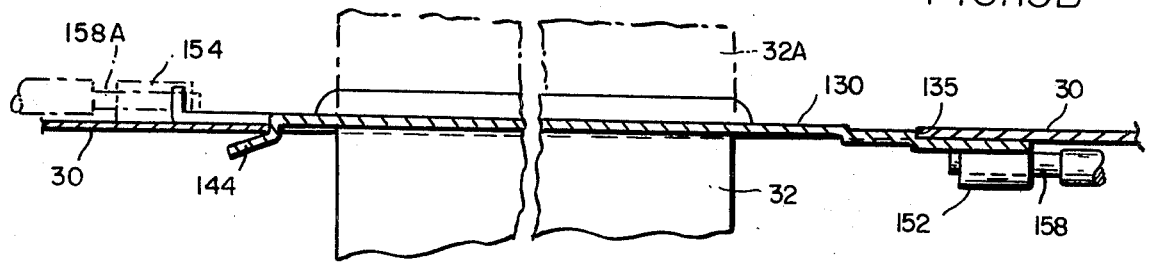
FIG. 14 is a sectional view similar to FIG. 13B showing, in solid lines, the mounting plate of FIG. 13A installed from the inside of a lighting fixture and, in dashed lines, installed from outside the lighting fixture, particularly illustrating the grounding connection between the mounting plate and the fixture receptacle.

For providing maximum flexibility and reducing installation labor, it is preferred that the fixture receptacle 32 be installed in a lighting fixture by means a mounting plate 130 (see FIGS. 13A, 13B and 14). For these purposes, a mounting plate similar to one marketed by the Keystone Lighting Corporation as their part no. 83033 is recommended. The mounting plate shown in the figures is suitable for attaching the fixture receptacle either from inside the fixture or from outside the fixture.

A lighting fixture manufacturer, for example, would install a fixture receptacle from inside the fixture, on the production line; an electrical contractor would install a fixture receptacle from outside the lighting fixture, without having to disassemble the fixture to install a receptacle from the inside. While the same mounting plate may be used in both cases, fixture receptacle 32 would be installed on one side of the mounting plate in the first case and on the other side of the mounting plate in the second.

Referring now to FIG. 13A, the hole which must be provided in the fixture for securing the mounting plate 130 is shown by the dashed lines 132. To install the mounting plate, the right hand end of the mounting plate, having stepped portions 134 and 136, is inserted into the mounting hole. The mounting plate is then rotated so that the sharp, pointed portions of turned-down corners 138 face the mounting surface. The mounting plate is moved toward the right until edge 142 bears against the right hand end of the mounting hole, preventing further rightward motion. Next, the left end of the mounting plate is pushed toward the mounting surface so that raised tabs 144 pass through the mounting hole and flush tabs 146 bear against the mounting surface. The mounting plate is then slid or pushed toward the left. This motion will cause the sharp points of the turned-down corners 138 to cut through any paint or coating on the mounting surface, to establish a good metal-to-metal contact therewith. Just at the point where the edge 148 of the raised tabs 144 touches the left end of the mounting hole, the riser 135 between stepped portions 134 and 136 on the right end of the mounting plate will drop into the mounting hole and cause the mounting plate to become securely locked in place. The stepped portion 136 and crimp tab 152 will be on the opposite side of the mounting surface from flush tabs 146 and crimp tab 154.

The grounding terminals on the grounding contacts of the receptacle connector are wired to one of the crimp tabs 152 or 154, to complete the grounding connection between the cable sets and the fixture or other device on which the receptacle has been connected. As shown in FIG. 14, a wire 158, for example, may be used to connect the grounding contacts of fixture receptacle 32 to crimp tabs 152. If installed from outside the fixture, crimp tab 152 will be used for grounding, as stated above. If a fixture receptacle 32A (shown is phantom) is installed from outside the fixture, however, crimp tab 152 will be used for grounding. In the latter case, a wire 158A is indicated in phantom for this purpose.

It will be understood that the housing of a fixture receptacle may be secured to the mounting plate with rivets, nuts and bolts, or the like inserted through holes 156 and that the receptacle may be mounted on either side of the mounting plate, the choice being dependent upon whether the mounting plate is installed from inside or outside the fixture. No hardware is needed to secure the mounting plate to a fixture.

Figure 15:
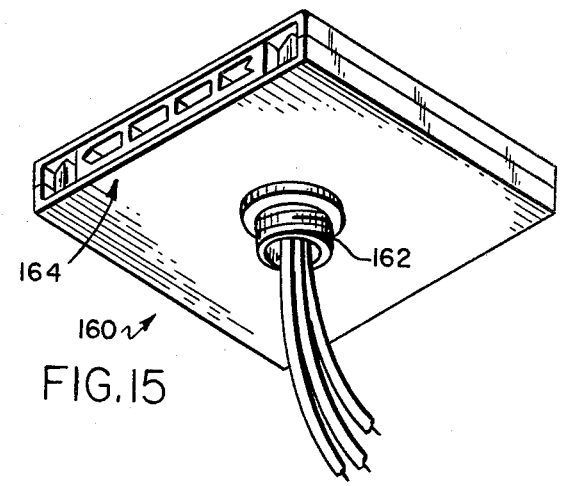
FIG. 15 is a bottom perspective view of a device or fixture adaptor for converting prior art load devices to the flexible wiring system of the present invention.

For retro-fitting lighting fixtures of prior art design to the presently described flexible wiring system, the adapter 160 of FIG. 15 may be employed. This adapter is provided with a short, threaded stem section 162 by which it may be mounted to the fixture or other load device. In the case of a conventional lighting fixture supplied with a standard ½ inch knock-out, the threaded stem 162 is inserted through the knock-out hole and a lock nut is then tightened onto the stem. When a fixture has already been hard wired, the conversion may be accomplished by simply removing the conduit adapter, dropping the threaded stem 162 into the hole which is left, and then securing the adapter with a lock nut. A female connector 164 is provided on one end of the adapter and a male connector is provided on the opposite end. Each corresponding pair of male and female contacts may be formed as a unitary or integral assembly 166, as shown in the side view of FIG. 15. A crimp tab 168 is provided for attaching a wire to the contact assembly. Connection of the wires to the fixture is accomplished by simply wire-nutting them to the wires of the fixture ballast(s).

Figure 18:
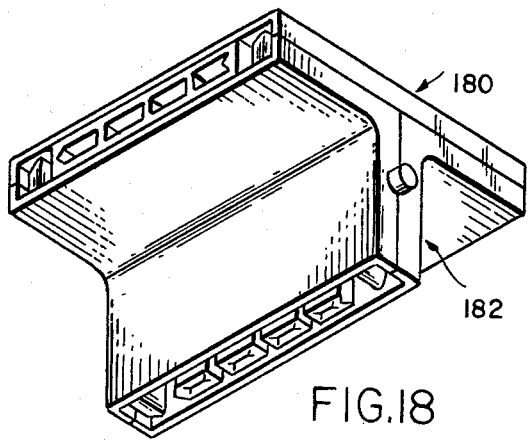
FIG. 18 is a perspective view of a T-shaped adaptor according to the present invention.
Figure 17:
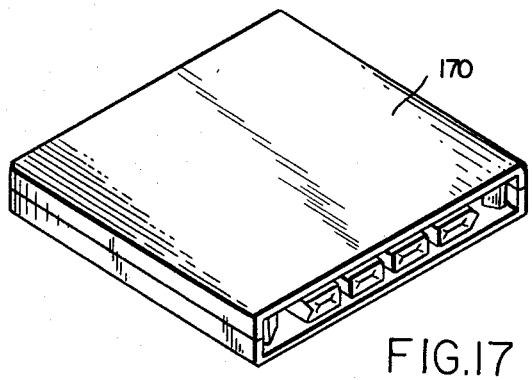
FIG. 17 is a top, perspective view of a cable set coupler according to the present invention.

Two additional system components are shown in FIGS. 17 and 18. It will be realized that other components may also be assembled to be compatible with those shown by generally employing the contact and connector designs illustrated above.

The item shown in FIG. 17 is a straight-through coupler 170. The straight-through coupler is similar to the adapter 160 of FIG. 15 except that crimp tabs are not necessary on the unitary male/female contact assemblies as no wires are connected thereto. Likewise, the threaded stem is not needed since the coupler is not mounted on a fixture or device. The straight-through coupler merely permits a male cable connector to be mated with a female cable connector so that short lengths of cable may be combined. A T-shaped coupler 180 is shown in FIG. 18. This unit is principally intended for use when clearance above a fixture is less than the (approximately) six inches normally required for plugging in and out of the fixture receptacle. The stem portion 182 of the T plugs into a fixture receptacle in the same fashion as does a cable connector. Power can then be received and distributed through cable set, installed parallel to the top of the fixture.

Figure 19:
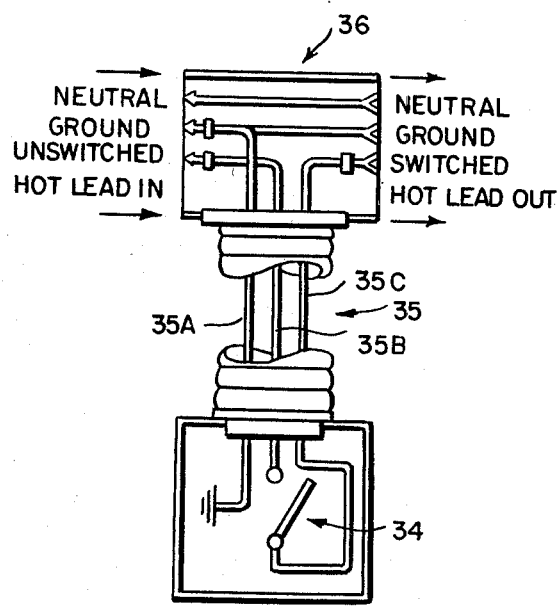
FIG. 19 is a wiring diagram of single circuit, single pole switching employing a single circuit switching coupler according to the present invention.

The switching coupler 36 of FIG. 1 may be described as somewhat of a hybrid of some of the other elements and assemblies described above. In contrast to the adapter 160, the switch/receptacle coupler 36 is provided with an integral cable whip mounted on the side portion, rather than having the stem 162 on the bottom thereof and wires passing there through. Also, instead of having all straight-through unitary contacts 166, the contacts for the "hot" lead are of the individual type of male female contacts used in the cable connection. A diagrammatic wiring illustration is shown in FIG. 19, depicting a single circuit, single pole switching arrangement using the switching coupler 36. Since grounding is accomplished at all times with a ground wire, as well as by connecting exposed metal surfaces, cable whip 35 has three wires: ground wire 35A, a second wire 35B connected to one terminal of the switch and carrying unswitched power, and a third wire 35C connected to the other terminal of the switch and providing switched power out through the female connection of the coupler. In the wiring diagrams male contacts are designated with arrowheads, while female contacts are designated with arrow tails.

Figure 20:
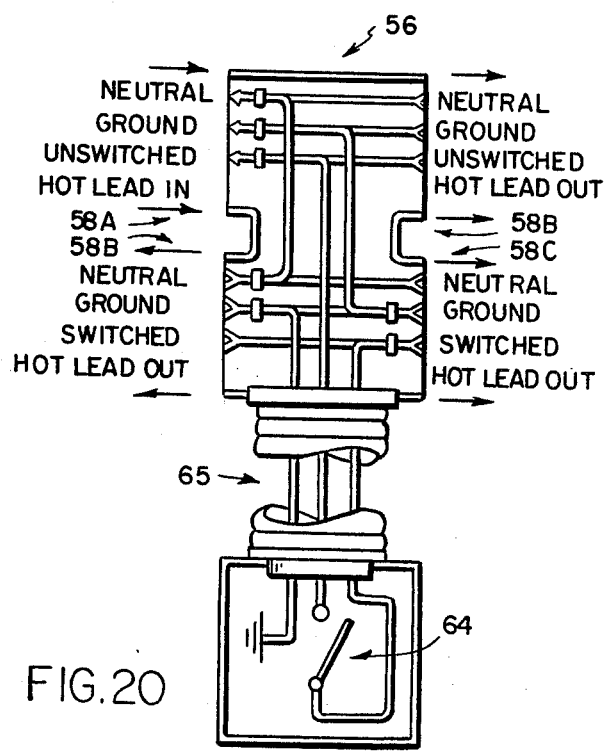
FIG. 20 is a wiring diagram of single circuit system using a single circuit, single pole switching and distribution coupler according to the present invention.

A similar diagrammatic illustration in FIG. 20 shows one simple possible embodiment of the switching and distribution coupler 56 of FIG. 1. In this embodiment, single circuit, single pole switching is provided at two connectors 58C and 58D; connector 58B is unswitched and permits straight through distribution of power. On the other hand, if the switched contacts of connectors 58C and 58D were individually controlled by separate single pole switches, the switching scheme discussed in connection with FIG. 1 would be accomplished.

Conventional duplex wiring receptacles may be connected analogous to switches. A receptacle coupler for this purpose is the same as a switching coupler except that the hot lead is not broken in the coupler. The cable whip will carry hot, neutral and ground wires to the receptacle.

It will thus be appreciated from the foregoing discussion that the above-described flexible wiring system and its components provide numerous desirable and advantageous features and aspects. Overall, parts count is low and parts are designed for relatively inexpensive mass-production. Installation involves an absolute minimum of labor and principally comprises connecting modular components. The system is designed for maximum safety and fool-proof assembly. All cables and cable sets are positively grounded at both ends and special grounding contacts are provided for grounding cable connector shrouds and other housings of a similar type, such as coupler housings. A cable connector latching mechanism is enclosed within a cable connector shroud and the latching dogs are similarly protected.

Only a single rectangular cutout is needed for installing a receptacle coupler mounting plate and, correspondingly, only a single hole is needed for mounting the fixture adapter. The fixture receptacle, fixture adapter and receptacle coupler all perform a three-fold purpose: receiving power from one cable set, transmitting power to another cable set, and tapping power off to feed a device or fixture.

The couplers which are used to connect switches and receptacles (i.e., conventional duplex receptacles) into the wiring system are independent of cable sets and, thus, mirror the functioning of conventional junction boxes. It is therefore possible to employ one or more standard lengths of cable on such couplers and to mount the couplers directly above the associated switches or receptacles. By contrast, other prior flexible wiring systems run cables directly between fixture locations and, switches or receptacles and therefore, can not use standard cable lengths in that situation.

Further, while the same versatility as a junction box is provided, the conventional junction box, cover plate, conduit fittings, conduit, wire nuts, and other associated components are not needed and it is possible to dispense with the labor for assembling the same at the installation location.

All cables and connectors are keyed for proper insertion and for a particular voltage and/or function intended. Improper connections are carefully guarded against.

Fixture or device connection is easily and efficiently accomplished by means of unitary contact assemblies comprising a male contact, a female contact, and interconnecting bussbar and crimp lugs or the like for securing a wire thereto.

It will be appreciated from the above discussion that the illustrated embodiment in intended to be exemplary only, and not limiting. Various modifications, alterations, and combinations of the components and assemblies will readily occur to those familiar with the art from the concepts and designs disclosed. Thus it is intended that the scope of the invention can be limited only as defined by the following claims and equivalents thereto.

What is claimed is:

1. A receptacle connector assembly for use in adapting an appliance to use in a flexible wiring-type branch circuit electrical power distribution system comprising:

a male receptacle connector;
a female receptacle connector;
the male and female receptacle connectors each including a plurality of male and female electrical contacts, respectively, and housings for such contacts;
the housings for male contacts being of a female type and the housings for female contacts being of a male type; each such receptacle connector including physical keying means for defining a single permissble orientation for such receptacle connector to mate to plug connector;
each male contact being associated with a corresponding female contact and each such associated male-female contact pair being integrally formed from a single piece of suitably cut and bent sheet metal stock, and a portion of such sheet metal stock forming a bussbar conductor between the male and female contacts;
each male contact/female contact/bussbar assembly including means for securing thereto a wire from the appliance.

2. The connector assembly of claim 1 wherein each male contact/female contact/bussbar assembly is formed in a generally U-shaped configuration, with the male and female contacts forming the sides of the U and the bussbar forming the bridge between them.

3. The connector assembly of claim 1 or claim 2 wherein the housings for the male and female contacts are integrally formed of molded plastic adapted to receive the contacts.

4. The connector assembly of claim 3 wherein the male contacts are arranged substantially colinearly with each other and the female contacts are arranged substantially colinearly with each other, such that the male and female connector assemblies are disposed substantially parallel to each other, side-by-side.

5. The connector assembly of claim 4 wherein the male type housings are dead-fronted.

6. The connector assembly of claim 5 wherein at least one male type housing for a female contact includes physical keying means associated with a predetermined rating electrical usuage for the connector, for preventing a male contact in a plug connector from mating therewith unless the plug connector is adapted to mate to said physical keying means, whereby only connectors having like physical keying means may be mated.

7. The receptacle connector assembly of claim 6 wherein at least one of the male and female receptacles includes a contact housing having no electrical contact disposed therein and wherein such contactless housing is provided with the physical keying means associated with connector contact rating.

* * * * *